(12) United States Patent
Bernat et al.

(10) Patent No.: US 10,949,313 B2
(45) Date of Patent: Mar. 16, 2021

(54) AUTOMATIC FAILOVER PERMISSIONS

(71) Applicant: Intel Corporation, Santa Clara, CA (US)

(72) Inventors: Francesc Guim Bernat, Barcelona (ES); Karthik Kumar, Chandler, AZ (US); Susanne M. Balle, Hudson, NH (US); Daniel Rivas Barragan, Cologne (DE); Patrick Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 15/635,245

(22) Filed: Jun. 28, 2017

(65) Prior Publication Data

US 2019/0004910 A1    Jan. 3, 2019

(51) Int. Cl.
| | | |
|---|---|---|
| G06F 11/00 | (2006.01) | |
| G06F 11/20 | (2006.01) | |
| G06F 21/44 | (2013.01) | |
| G06F 21/62 | (2013.01) | |
| H04L 29/08 | (2006.01) | |
| G06F 21/71 | (2013.01) | |
| H04L 29/06 | (2006.01) | |

(52) U.S. Cl.
CPC ...... *G06F 11/2007* (2013.01); *G06F 11/2025* (2013.01); *G06F 11/2033* (2013.01); *G06F 11/2041* (2013.01); *G06F 11/2046* (2013.01); *G06F 21/44* (2013.01); *G06F 21/6218* (2013.01); *G06F 21/71* (2013.01); *H04L 67/1097* (2013.01); *G06F 11/2015* (2013.01); *G06F 2201/805* (2013.01); *H04L 63/10* (2013.01)

(58) Field of Classification Search
CPC ............ G06F 11/2007; G06F 11/2025; G06F 11/2044; G06F 11/2041; G06F 11/2046; G06F 21/44; G06F 21/6218; G06F 21/71; H04L 67/1097
See application file for complete search history.

(56) References Cited

U.S. PATENT DOCUMENTS

| | | | |
|---|---|---|---|
| 2016/0179383 A1* | 6/2016 | Krithivas | G06F 9/5016 711/170 |
| 2018/0024964 A1* | 1/2018 | Mao | G06F 9/5016 711/173 |

* cited by examiner

*Primary Examiner* — Joshua P Lottich
(74) *Attorney, Agent, or Firm* — Patent Capital Group

(57) ABSTRACT

A network controller, including: a processor; and a resource permission engine to: provision a composite node including a processor and a first disaggregated compute resource (DCR) remote from the processor, the first DCR to access a target resource; determine that the first DCR has failed; provision a second DCR for the composite node, the second DCR to access the target resource; and instruct the target resource to revoke a permission for the first DCR and grant the permission to the second DCR.

25 Claims, 11 Drawing Sheets

AUTOMATIC FAILOVER PERMISSIONS

FIELD OF THE SPECIFICATION

This disclosure relates in general to the field of cloud computing, and more particularly, though not exclusively to, a system and method for automatic failover permissions.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
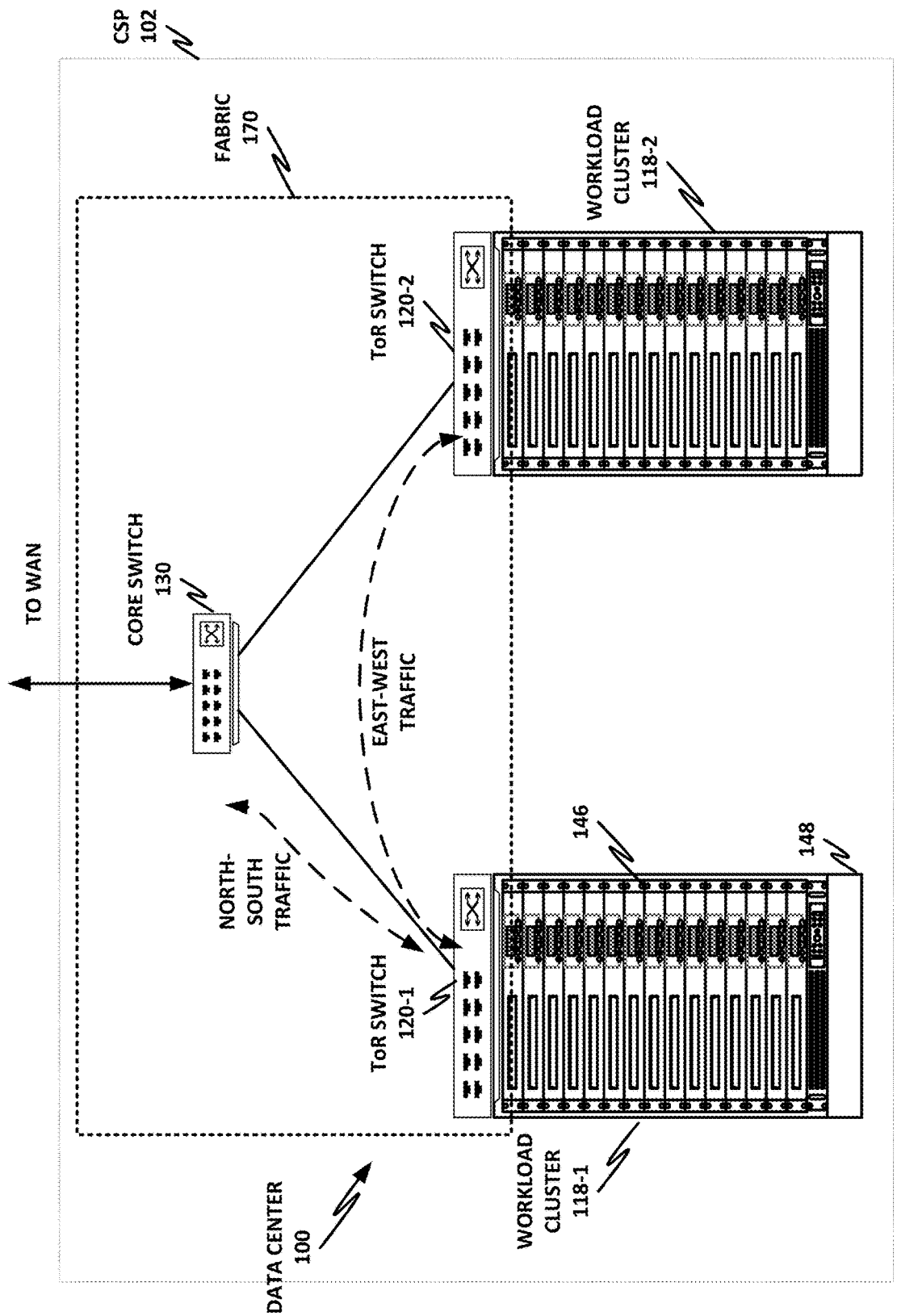
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One substantial advantage of the modern data center is that individual devices do not necessarily need to have all of the onboard capabilities that enable them to perform useful functions. In the contemporary data center, even a server with mere processing power, and little or no additional onboard resources, can perform highly capable functions. Rather than providing specialized resources on each server, those specialized resources can be distributed onto shared resource banks that can be dynamically provisioned or deprovisioned to whichever node needs them. Thus, for example, a node performing a data server function that is assisted by a high-speed FPGA performing a dedicated function in hardware need not have the FPGA onboard with the processor. Rather, a very capable, high-speed low latency fabric, such as the Omni-Path™ and UPI fabrics by Intel®, may provide such rapid interconnection between nodes that resources located in a dedicated resource pool can be used and accessed by the local node as though they were local resources.

This architecture is also aided by next-generation fabric interfaces, such as the Intel® Host Fabric Interface (HFI), which may provide interfaces that enable a local host processor to issue reads and writes as though to a local resource. The fabric interface may then include logic to offboard those requests to an appropriate shared resource, collect results, and provide the results back to the local host processor.

One contemporary trend is the use of Intel® Rack Scale Design (RSD) "sleds" to aggregate a large pool of resources into a single unit. Continuing with the example of an FPGA, an RSD sled may include shared power and a plurality of resource cards, or resource instances provided as pluggable cards (sleds). The resource instances may be plugged into the sled chassis, and then the sled chassis may be plugged into a server rack. This architecture provides high-density pools of computing resources.

One challenge that is faced in the sled computing paradigm is that line replaceable units (LRUs) occasionally fail. Consider for example the case of a sled providing a pool of FPGAs programmed to perform an auxiliary function. If the power supply of the sled fails, the FPGA ceases to function. According to standard software defined infrastructure (SDI) practice, an SDI controller may then provision a new FPGA in a different sled to take over the function of the FPGA in the failed sled.

However, this may present a difficulty if the failed power supply of the original sled is replaced. When the power supply is replaced, the FPGA begins operating again. Because the programming of an FPGA is nonvolatile, the FPGA may essentially pick up where it left off. It begins performing its programmed computing function, and attempts to read from and write to its designated memory block as before the power supply failed. However, the restored FPGA no longer owns those memory locations. After the power supply failed and the sled went down, the function of that FPGA was taken over by an FPGA in a different sled. Thus, the original FPGA's attempts to read from and write to memory may result in collisions and data corruption.

Although it is possible to address such collisions in software, such as at the TCP/IP layer of the network stack, this can be very slow in terms of data center speeds and may defeat the speed advantages provided by the fabric.

Thus, it is beneficial to provide a mechanism to address such collisions at a lower level where collisions can be handled at fabric speeds. In one example, the sled includes a fabric interface to the fabric. This fabric interface may assign permissions to various resources, such as read and write permissions that are assigned to a particular FPGA, which may be identified by a universally unique identifier (UUID). Thus, when the fabric interface for the sled receives an incoming read or write request, it may be accompanied by an identifier for the originating device. If the originating device does not have the appropriate permissions to read from or write to the resource, then the attempted operation fails, and the fabric interface may return a response such as a NAK.

A system and method for SDI automatic failover recover protection will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface™ (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect™ (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
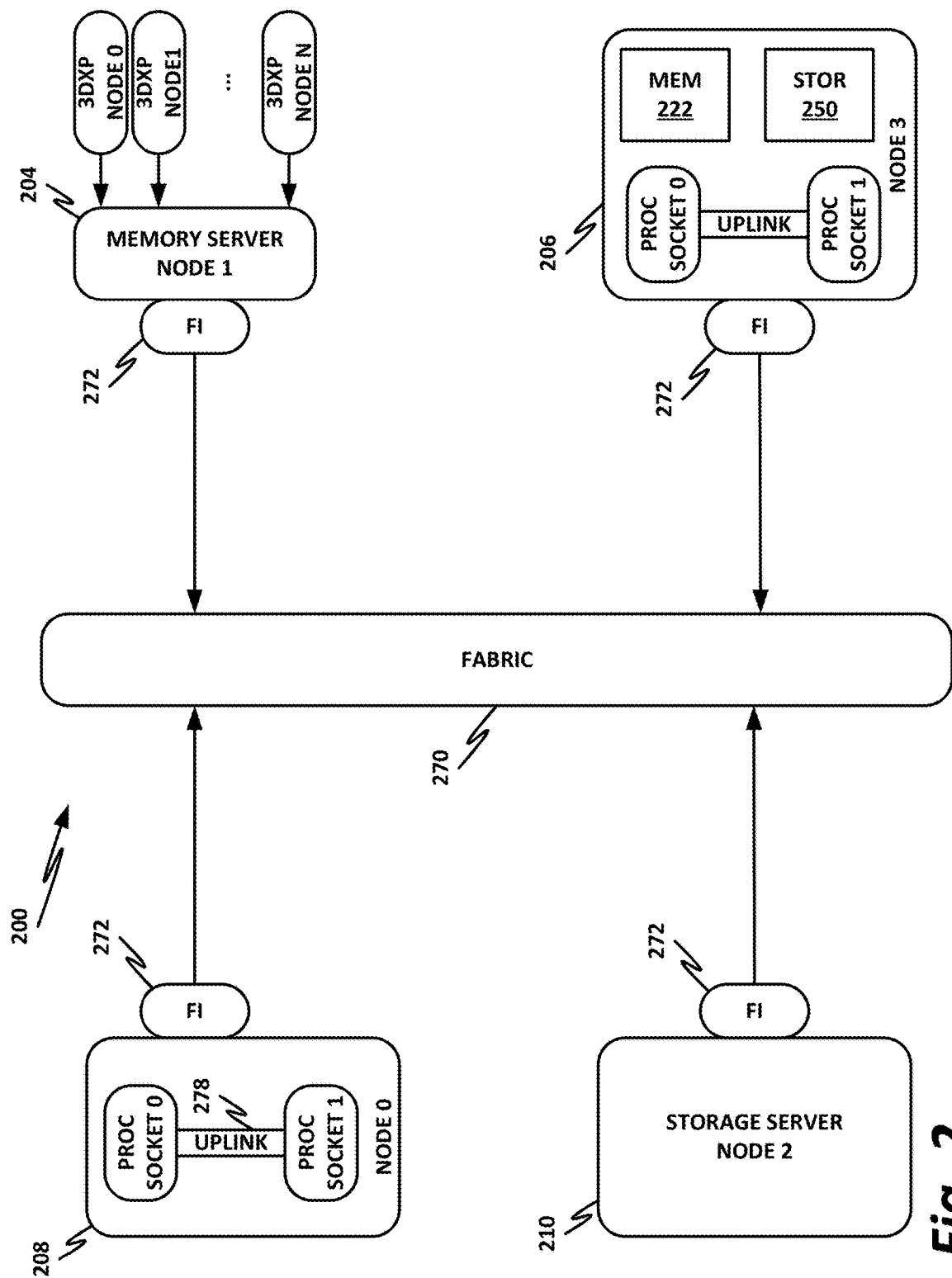
FIG. 2 is a block diagram of a data center according to one or more examples of the present specification.

FIG. 2 is a block diagram of a data center 200 according to one or more examples of the present specification. Data center 200 may be, in various embodiments, the same data center as Data Center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface™ for connecting to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned and/or deprovisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 2808, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, computer-readable medium having stored thereon executable instructions for instructing a processor to perform a certain task. Such a medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
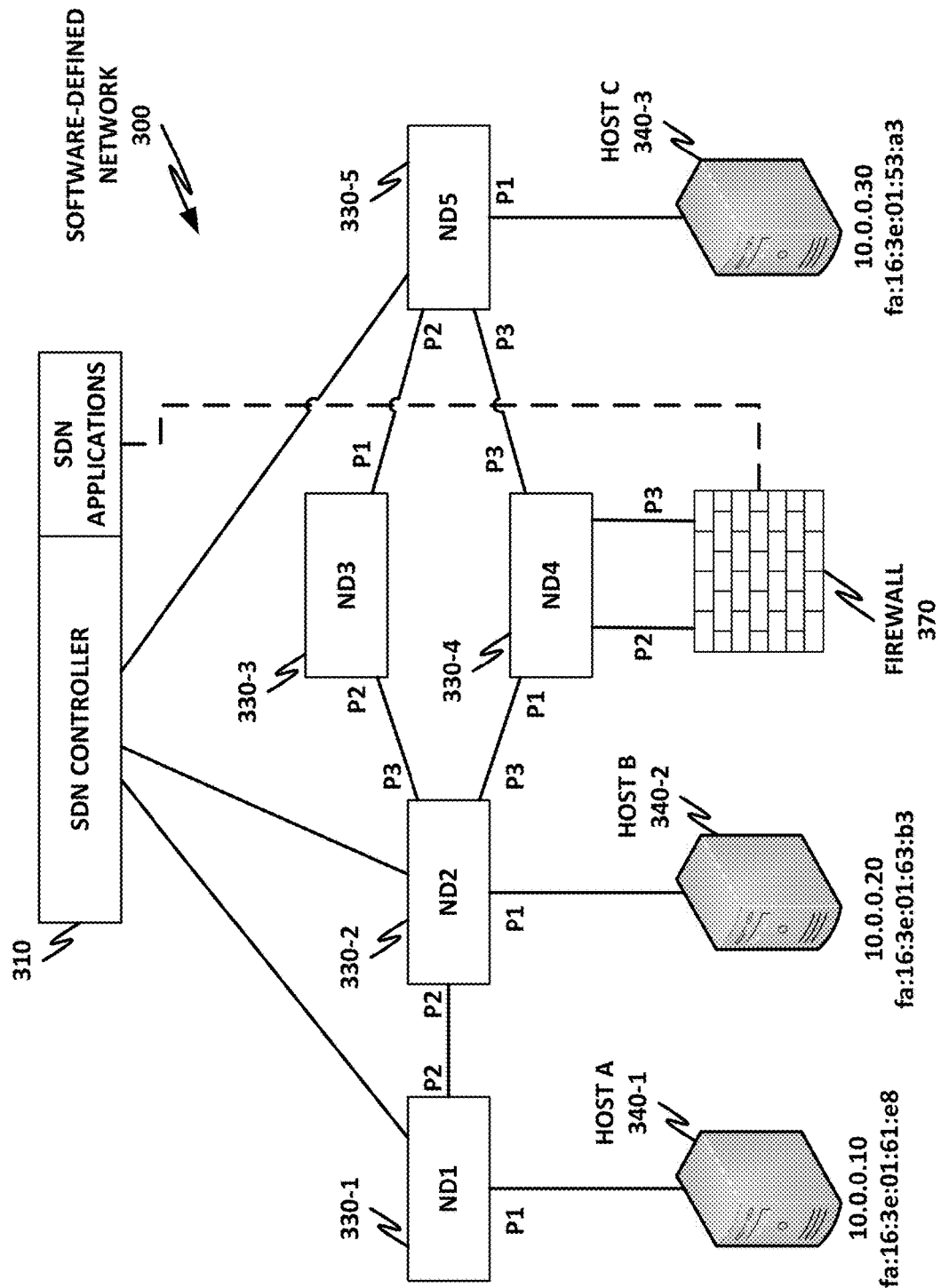
FIG. 3 is a block diagram of a software-defined network, according to one or more examples of the present specification.

FIG. 3 is a block diagram of a software-defined network 300, according to one or more examples of the present specification. In software defined networking (SDN), a data plane is separated from a control plane to realize certain advantages. SDN is only one flavor of virtualization, shown here to illustrate one option for a network setup.

SDN 300 is controlled by an SDN controller 310. SDN controller 310 is communicatively coupled to a plurality of network devices 330. Specifically, ND1 330-1, ND2 330-2, and ND5 330-5 are directly communicatively coupled to SDN controller 310. Network devices ND3 330-3 and ND4 330-4 are not directly coupled to SDN controller 310, but rather coupled via the intermediate devices, such as ND2 330-2, and ND5 330-5.

Some network devices 330 also communicatively couple directly to host devices 340. Specifically, network device ND1 directly couples to host A 340-1, which has IP address 10.0.0.10, and MAC address FA:16:3:01:61:8. Network device ND2 330-2 directly couples to host B 340-2, which has IP address 10.0.0.20, and MAC address FA:16:3:01:63:B3. Network device ND5 330-5 directly couples to host D 440-3, which has IP address 10.0.0.30, and MAC address FA:16:3:01:54:83.

Network devices 330 may be configured to perform a variety of network functions, such as, by way of nonlimiting example, load-balancing, firewall, deep packet inspection (DPI), DNS, antivirus, or any other suitable network function. The particular arrangement of interconnections between network devices 330 and from network devices 330 to host devices 340 may be determined by the particular network configuration and needs. Thus, the specific configuration of FIG. 3 should be understood to be an illustrative example only.

Each network device 330 may have a plurality of ingress and/or egress interfaces, such as physical Ethernet or fabric ports. In an example, each interface may have a label or new name, such as P1, P2, P3, P4, P5, and so on. Thus, certain aspects of the network layout can be determined by inspecting which devices are connected on which interface. For example, network device ND1 330-1 has an ingress interface for receiving instructions and communicating with SDN controller 310. ND1 330-1 also has an interface P1 communicatively coupled to host A 340-1. ND1 330-1 has interface P2 that is communicatively coupled to ND2 330-2. In the case of ND2 330-2, it also couples to ND1 330-1 on its own interface P2, and couples to host B 340-2 via interface P1. ND2 330-2 communicatively couples to intermediate devices ND3 330-3 and ND4 330-4 via interfaces P3 and P4 respectively. Additional interface definitions are visible throughout the figure.

A flow table may be defined for traffic as it flows from one interface to another. This flow table is used so that a network device, such as ND2 330-2 can determine, after receiving a packet, where to send it next.

For example, the following flow tables may be defined for ND1 330-1-ND4 330-4.

TABLE 1

| ND1 Flow Rule | | | | | |
|---|---|---|---|---|---|
| Ingress I/F | Source MAC | Destination Mac | Source IP | Dest. IP | Action |
| P1 | ANY | fa:16:3e:01:54:a3 | ANY | 10.0.0.30 | P2 |

TABLE 2

| ND2 Flow Rule | | | | | |
|---|---|---|---|---|---|
| Ingress I/F | Source MAC | Destination Mac | Source IP | Dest. IP | Action |
| P2 | ANY | fa:16:3e:01:54:a3 | ANY | 10.0.0.30 | P4 |

TABLE 3

| ND3 Flow Rule | | | | | |
|---|---|---|---|---|---|
| Ingress I/F | Source MAC | Destination Mac | Source IP | Dest. IP | Action |
| P1 | ANY | fa:16:3e:01:54:a3 | ANY | 10.0.0.30 | P3 |

TABLE 4

| ND4 Flow Rule | | | | | |
|---|---|---|---|---|---|
| Ingress I/F | Source MAC | Destination Mac | Source IP | Dest. IP | Action |
| P3 | ANY | fa:16:3e:01:54:a3 | ANY | 10.0.0.30 | P1 |

Figure 4:
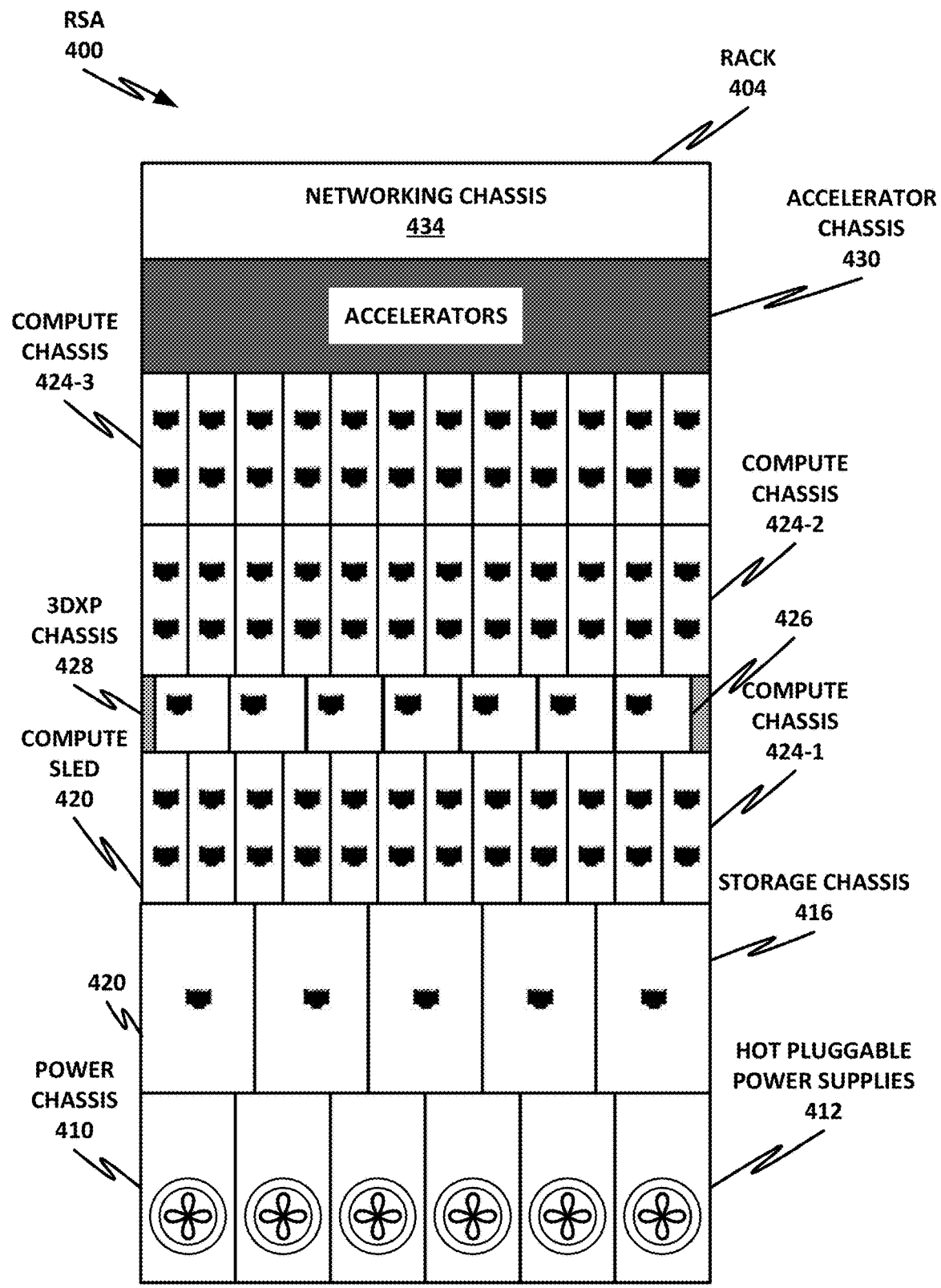
FIG. 4 is a block diagram of a rack scale architecture according to one or more examples of the present specification.

FIG. 4 is a block diagram of a rack scale architecture 400 according to one or more examples of the present specification. In this example, RSA 400 includes a single rack 404, to illustrate certain principles of RSD. It should be understood that RSA 400 may include many such racks, and that the racks need not be identical to one another. In some cases a multipurpose rack such as rack 404 may be provided, while in other examples, single-purpose racks may be provided. For example, rack 404 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 404 of FIG. 4 should be understood to be a nonlimiting example of a rack that may be used in an RSA 400.

In the example of FIG. 4, rack 404 may be a standard rack with an external width of approximately 23.6 inches and a height of 78.74 inches. In common usage, this is referred to as a "42U rack." However, rack 404 need not conform to the "rack unit" standard. Rather, rack 404 may include a number of chassis that are optimized for their purposes.

Rack 404 may be marketed and sold as a monolithic unit, with a number of line replaceable units (LRUs) within each chassis. The LRUs in this case may be sleds, and thus can be easily swapped out when a replacement needs to be made.

In this example, rack 404 includes a power chassis 410, a storage chassis 416, three compute chassis (424-1, 424-2, and 424-3), a 3-D Crosspoint™ (3DXP) chassis 428, an accelerator chassis 430, and a networking chassis 434. Each chassis may include one or more LRU sleds holding the appropriate resources. For example, power chassis 410 includes a number of hot pluggable power supplies 412, which may provide shared power to rack 404. In other embodiments, some sled chassis may also include their own power supplies, depending on the needs of the embodiment.

Storage chassis 416 includes a number of storage sleds 420. Compute chassis 424 each contain a number of compute sleds 420. 3DXP chassis 428 may include a number of 3DXP sleds 426, each hosting a 3DXP memory server. And accelerator chassis 430 may host a number of accelerators, such as Intel® Quick Assist™ technology (QAT), FPGAs, ASICs, or other accelerators of the same or different types. Accelerators within accelerator chassis 430 may be the same type or of different types according to the needs of a particular embodiment.

Over time, the various LRUs within rack 404 may become damaged, outdated, or may experience functional errors. As this happens, LRUs may be pulled and replaced with compatible LRUs, thus allowing the rack to continue full scale operation.

Figure 5:
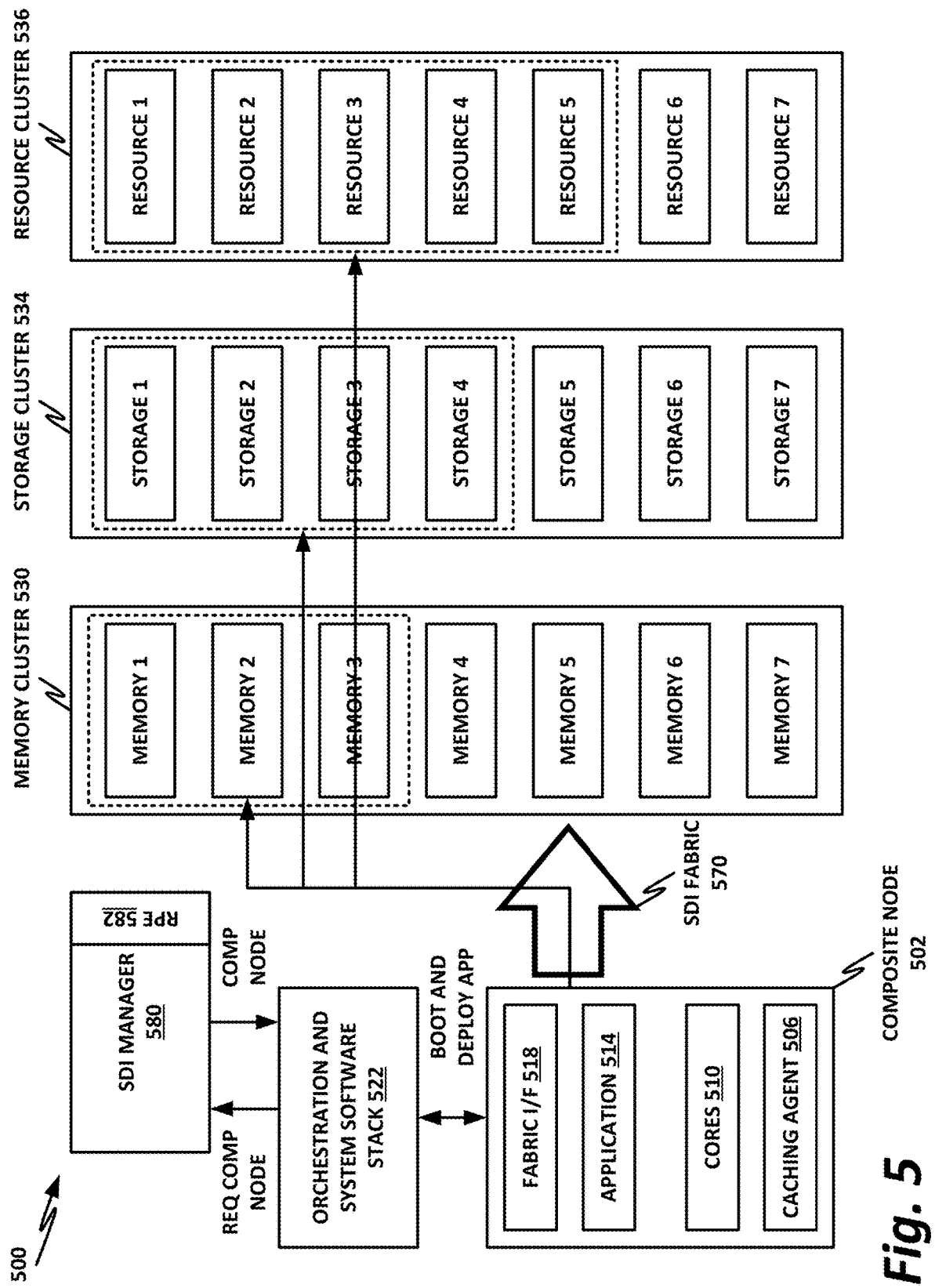
FIG. 5 is a block diagram of an SDI data center, according to one or more examples of the present specification.

FIG. 5 is a block diagram of an SDI data center 500, according to one or more examples of the present specification. Certain applications hosted within SDI data center 500 may employ a set of resources to achieve their designated purposes, such as processing database queries, serving web pages, or providing computer intelligence.

Certain applications tend to be sensitive to a particular subset of resources. For example, a SAP HANA database may use processors, memory, disk, and fabric, while being most sensitive to memory and processors. In one embodiment, node 502 includes one or more cores 510 that perform the processing function. Node 502 may also include caching agents 506 that provide access to high-speed cache. One or more applications 514 run on node 502, and communicate with the SDI fabric via fabric interface 518. Dynamically provisioning resources to node 502 may include selecting a set of resources and ensuring that the quantities and qualities provided meet required performance indicators, such as service level agreements and quality of service. Resource selection and allocation for application 514 may be performed by a resource manager, which may be implemented within orchestration and system software stack 522. By way of nonlimiting example, throughout this specification the resource manager may be treated as though it can be implemented separately or by an orchestrator. Note that many different configurations are possible.

In a software defined infrastructure (SDI) data center, applications may be executed on top of a composite node such as node 502 that is dynamically allocated by SDI manager 580, which may broadly be an SDI manager, orchestrator, VMM, or any combination of functions providing a network controller. Composite node 502 is referred to as "composite" because its resources are not necessarily co-located. Rather, they may include resources that are disaggregated from the host hardware platform, distributed across a rack or in different parts of the data center, dynamically allocated, and virtualized to the specific application 514.

In this example, three units of memory from memory cluster 530 are allocated to application 514, four units of storage from storage cluster 534 are allocated, and five units of another resource from resource cluster 536 are allocated to application 514 running on composite node 502. All of these resources may be associated to a particular compute sled and aggregated to create the composite node. Once the composite node is created, the operating system may be booted in node 502, and the application may start running using the aggregated resources as if they were physically collocated resources. As described above, fabric interface 518 may provide certain interfaces that enable this operation to occur seamlessly with respect to node 502.

As a general proposition, the more memory and compute resources that are added to a database processor, the better throughput it can achieve. However, this is not necessarily true for the disk or fabric. Adding more disk and fabric bandwidth may not necessarily increase the performance of the SAP HANA database beyond a certain threshold.

SDI data center 500 may address the scaling of resources by mapping an appropriate amount of offboard resources to the application based on application requirements provided by a user or network administrator or directly by the application itself. This may include allocating resources from various resource clusters, such as memory cluster 530, storage cluster 534, and resource cluster 536.

In an example, SDI controller 580 also includes a resource protection engine (RPE) 582, which is configured to assign permission for various target resources to disaggregated compute resources (DRCs) that are permitted to access them. In this example, the resource are expected to be enforced by a fabric interface servicing the target resource.

Figure 6:
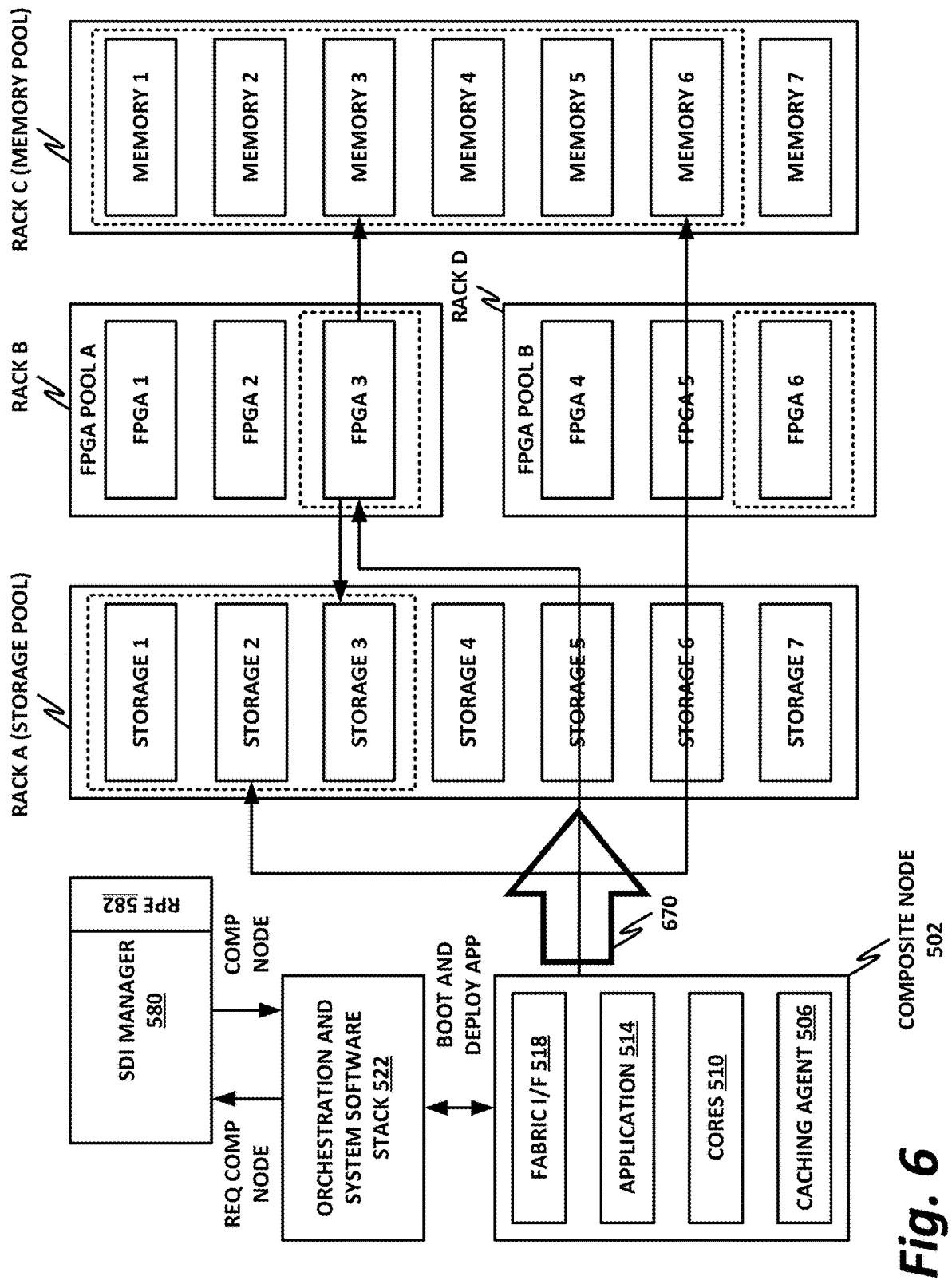
FIG. 6 is a block diagram of an SDI data center showing a modified view with additional resource allocations, according to one or more examples of the present specification.

FIG. 6 is a block diagram of SDI data center 500 showing a modified view with additional resource allocations, according to one or more examples of the present specification.

Within the SDI context, disaggregated compute resources (DCRs) that are part of composite node 502 may have concurrent access to other DCRs within the same composite node. Each DCR may have host hardware (e.g., a sled of physical resources) that can dynamically provision or deprovision resources to a composite node, based on instructions from a controller or orchestrator.

For example, rack A is a storage pool in which three units of storage have been allocated to composite node 502. Rack B is an FPGA pool in which one FPGA has been allocated to composite node 502. Rack C is a memory pool in which six units of memory have been allocated to composite node 502. FPGA 3, which is in FPGA pool A on rack B, and which is part of composite node 502 may freely access memory 3, which is on rack C, and which has also been allocated to composite node 502, and storage 2, which is on rack A and has been allocated to composite node 502.

To maintain the composite node architecture of the SDI paradigm, DCRs that are part of composite node 502 are able to access the DCRs via a fabric interface without the intervention of software. For example, if application 514 is a database application, the software may issue a standard operating system load or store instruction, and the driver for fabric interface 518 intercepts those load and store operations and directs them to the appropriate disaggregated resource of composite node 502. Requiring the software to include additional processing that is aware of the disaggregated nature of composite node 502 may introduce additional latency and processing that may reduce some of the benefits of the SDI architecture. Similarly, a disaggregated compute resource such as an FPGA or accelerator should be able to issue load or store commands to other nodes connected over the same fabric via a single switch or multiple switches, depending on the topology.

As discussed above, this does lead to one potential problem. Applications running on composite node 502 may not intend for every disaggregated computing resource in the fabric to be able to issue commands to every other disaggregated resource in the composite node. This is somewhat analogous to the situation in a true hardware node, where page level permissions and protection keys in the memory system restrict access to certain memory locations, and file permissions restrict access to certain storage resources.

Similarly, within SDI data center 500, and within composite node 502, application 514 may need to assign to a memory region permissions such as:
- a. Read only to a set of disaggregated computing resources.
- b. Read/write to another set of disaggregated computing resources.
- c. Read/write/own to a third set of disaggregated computing resources.

This necessity could be driven, for example, by the different roles hosted in a data center.

To provide this memory architecture, SDI controller 580 may initially provision the DCRs for composite node 502, and then RPE 582 push out to a fabric interface servicing each DCR a set of permissions. These permissions could include, for example, a UUID for a resource to receive the permission, and a list of permissions to be granted or denied. For example, FPGA 3 may be granted full read, write, and own permission to memory 3 (or a memory range "X" in memory 3), with an instruction having the semantics:

GRANT(DCR=FPGA_3,target=Memory_3,range=X, perm=+R+W+O)

If FPGA 3 ceases to function (e.g., the sled hosting it loses network connection or power), then FPGA 6 in rack D could be provisioned to take its place. Once FPGA 6 is provisioned as part of composite node 502, it may be granted permission as follows:

GRANT(DCR=FPGA_6,target=Memory_3,range=X, perm=+R+W+O)

Permissions for FPGA 3 may also be revoked:

GRANT(DCR=FPGA_3, target=Memory_3, range=X, perm=-R-W-O)

This ensures that if FPGA 3 resumes operation, it does not resume writing to memory block X, thus corrupting the memory.

Note that RPE 582 may be any suitable engine as used throughout this specification, and may be hosted, by way of nonlimiting example, on either SDI controller 580 or orchestrator 522. As used throughout this specification, an "engine" includes any combination of one or more logic elements, of similar or dissimilar species, operable for and configured to perform one or more methods provided by the engine. Thus, the engine may comprise one or more logic elements configured to provide methods as disclosed in this specification. In some cases, the engine include a special integrated circuit designed to carry out a method or a part thereof, and may also include software instructions operable to instruct a processor to perform the method. In one example, the engine includes executable instructions stored on a non-transitory medium operable to perform a method according to this specification.

Figure 7:
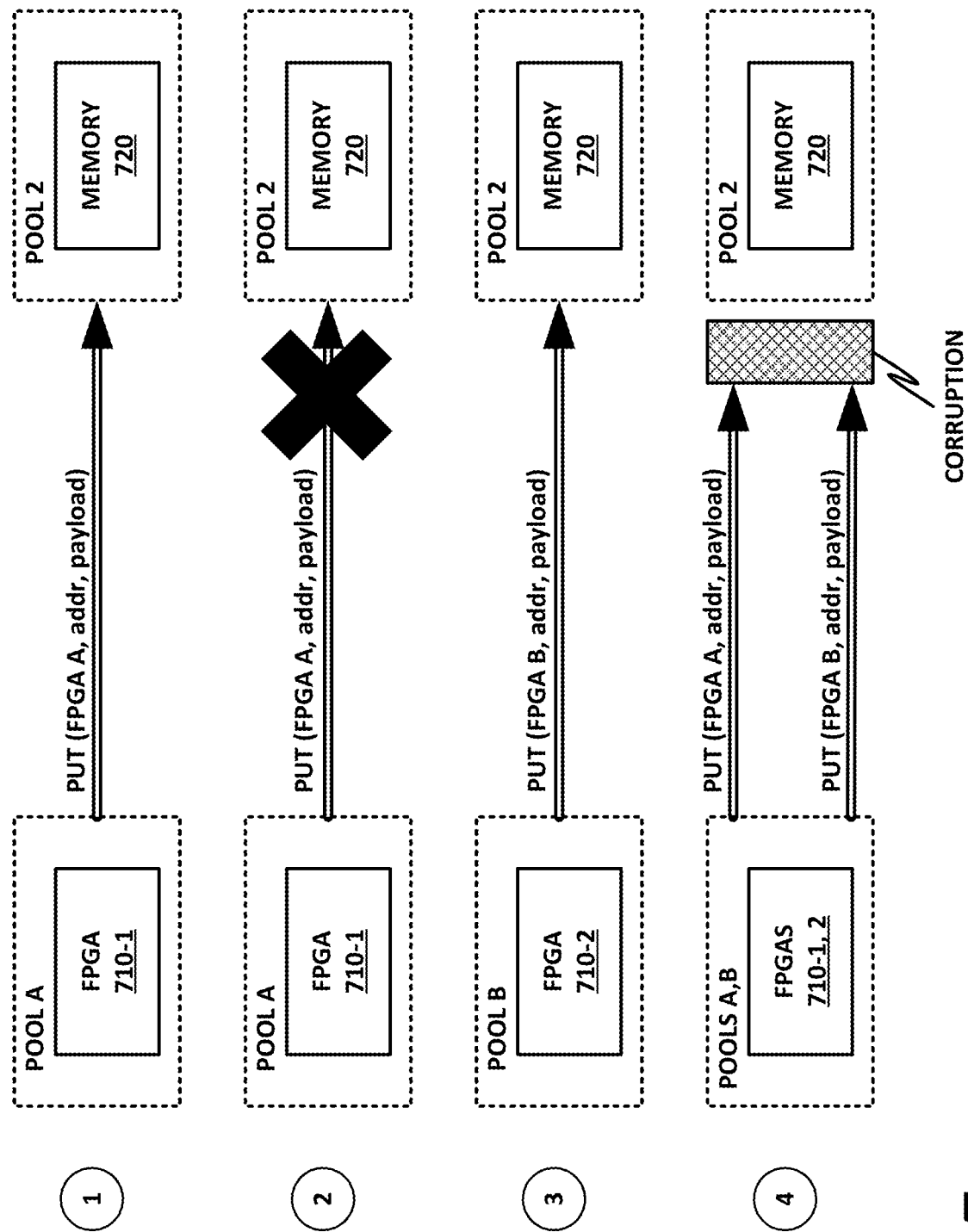
FIG. 7 is an example wherein the beneficial redundancy built into a data center may in fact provide a challenge, according to one or more examples of the present specification.

FIG. 7 illustrates an example where the beneficial redundancy built into a data center may in fact provide a challenge. In the example of FIG. 7, it can be assumed that FPGA 710-1 is hosted in pool A, such as is illustrated in FIG. 6. For example, pool A may be a compute sled hosting a pool of FPGAs with a hot-swappable power supply. Similarly, pool B may be a separate sled hosting a pool of FPGAs, including FPGA 710-2. FPGAs 710 may be programmed to perform an accelerated database query or access function in support of application 514, although this should be understood as an illustrative and nonlimiting example only.

In this example, FPGAs 710 write to a database in memory 720 by issuing a put command which includes as its parameters an identifier of the FPGA, such as a UUID, Mac address, IP address, or a memory address and a payload. Note that the put command is provided by way of nonlimiting and illustrative example only.

At one, as long as FPGA 710-1 continues operating normally, it's put commands to memory 720 of pool 2 are successful.

However, at two, FPGA 710-1 of pool A goes offline. For example, one or more of the power supplies of pool A may have failed. Thus, FPGA 710-1 is no longer providing valid puts to memory 720.

According to SDI operational principles, SDI controller 580 may then allocate FPGA 710-2 of pool B to take over the function previously performed by FPGA 710-1 of pool A. FPGA 710-2 then begins issuing valid put commands to memory 720 of pool 2.

However, a human network operator may discover the failure of the power supply in pool A, and may swap in a new functional power supply. Once the new functional power supply is plugged in, FPGA 710-1 resumes its operation. Because the programming of FPGA 710-1 is nonvolatile, FPGA 710-1 resumes its previous function, reading from and writing to memory 720. However, FPGA 710-2, which is now the valid "owner" of that memory space is also reading from and writing to that memory. Thus, at four, FPGAs 710-1 and 710-2 from pools A and B are both issuing put commands to memory 720 of pool 2. This route may result in memory corruption and undesirable operation.

While this issue can be handled in software, such as at the TCP/IP layer of the network stack, doing so may introduce additional latency into the data center and break the overall SDI architecture wherein offboarding of resources should be seamless and invisible to application 514.

Figure 8:
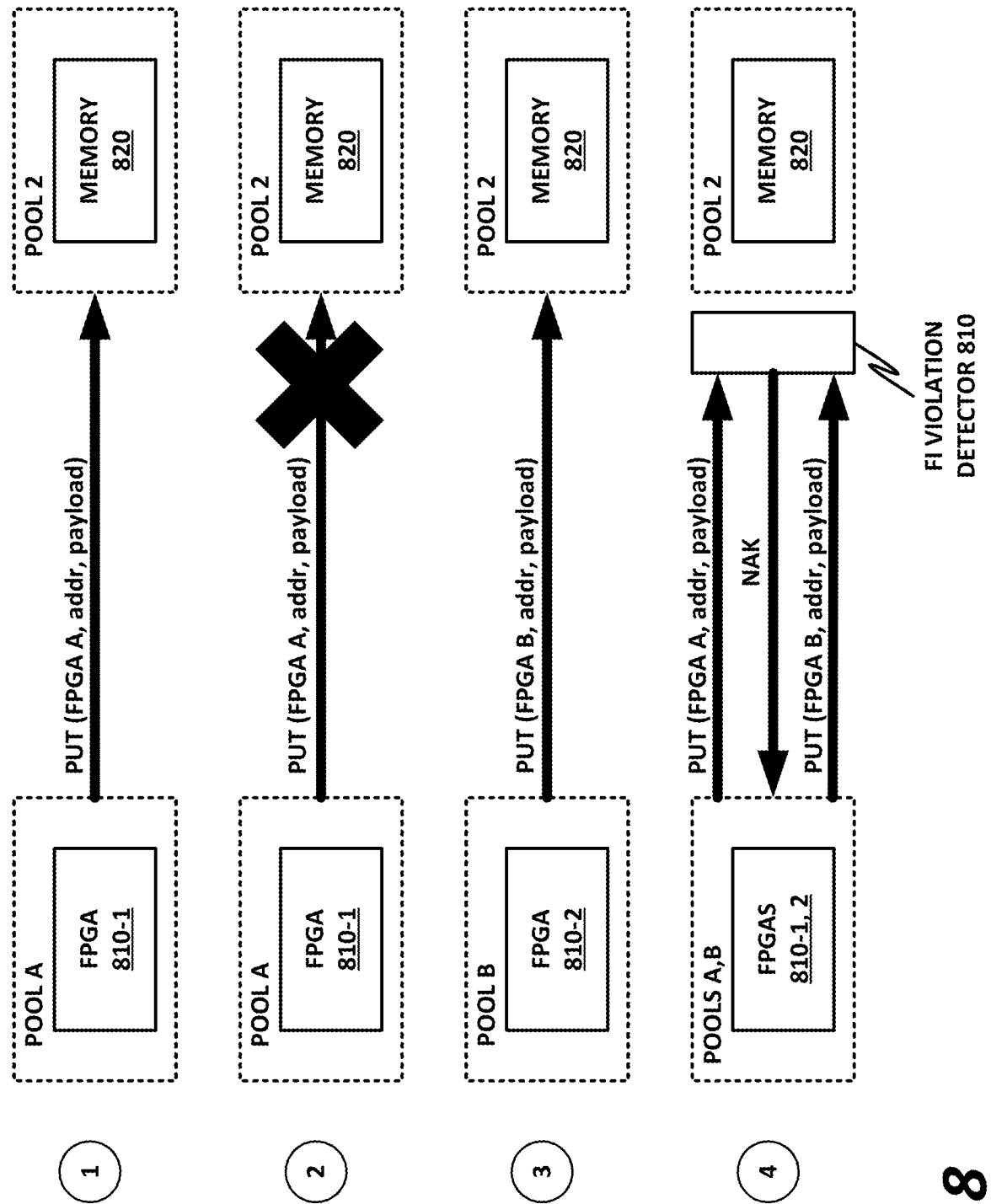
FIG. 8 is a block diagram illustrating an example where a fabric interface violation detector is provided to handle the above situation, according to one or more examples of the present specification.

FIG. 8 is a block diagram illustrating an example where a fabric interface violation detector 810 is provided to handle the above situation.

As before, at one, FPGA 710-1 issues puts to memory 720 of pool 2. At two, FPGA 710-1 goes offline and is no longer able to issue puts to memory 720.

SDI orchestrator 580 recognizes that FPGA 710-1 has gone down, and allocates FPGA 710-2 to take over its function. FPGA 710-2 then begins issuing puts to memory 720 according to its proper function.

Again at four, FPGA 710-1 comes back online, and again begins attempting to issue puts to memory 720. However, the SDI fabric interface of pool 2 includes a fabric interface violation detector 810.

Fabric interface (FI) violation detector 810 may associate certain permissions with resource addresses within its own onboard resources, and may assign those permissions, such as read, write, and ownership permissions to certain DCRs. Thus, when FPGAs 710-1 and 710-2 both issue put commands to memory 720, FI violation detector 810 receives as a parameter of each put command an identifier of the originating device, in this case FPGA A or FPGA B. When FI violation detector 810 receives a put command from FPGA B directed to the appropriate address, the memory operation is allowed. However, when FI violation detector 810 receives a put command from FPGA A directed to the address, FI violation detector 810 recognizes that this is an invalid memory request, and denies the requested operation. This may include, for example, sending a NAK back to FPGA A 710-1.

If properly programmed, FPGA A 710-1 should receive an AK, recognize that an error condition has been encountered, and may raise an exception or take some other remedial action.

Figure 9:
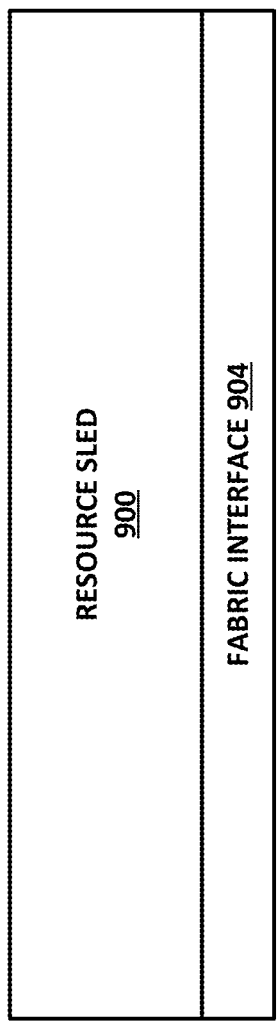
FIG. 9 is a block diagram illustrating that a particular resource sled may include a fabric interface, which may include an FI violation detector, according to one or more examples of the present specification.

FIG. 9 is a block diagram illustrating that a particular resource sled 900 may include a fabric interface 904, which may include, for example, an FI violation detector 810. It should be noted that resource sled 900 is provided as a nonlimiting example of a data center resource that may have such a fabric interface 904, and in general terms, the entire SDI data center that is used as an example throughout this specification may be understood to be a nonlimiting example.

Figure 10:
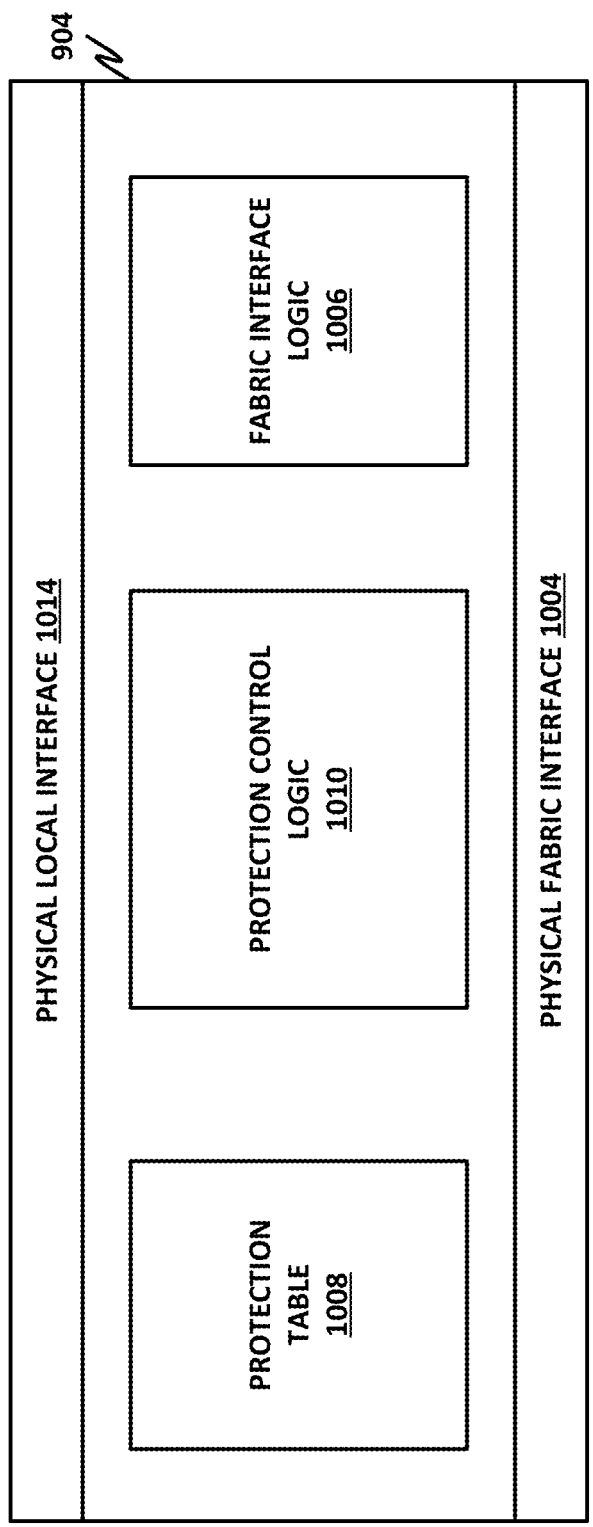
FIG. 10 is a block diagram of a fabric interface, according to one or more examples of the present specification.

FIG. 10 is a block diagram of fabric interface 904, according to one or more examples of the present specification. In this example, fabric interface 904 may include a physical fabric interface 1004 which physically interconnects to the SDI fabric. Fabric interface 904 also includes a physical local interface 1014 which physically interconnects fabric interface 904 to a local bus, such as a backplane of a compute sled. Fabric interface logic 1006 provides standard fabric interface functions that translate communication requests and that broker transfer of data between physical local interface 1014 and physical fabric interface 1004.

In this example, fabric interface 904 also includes a protection table 1008 that stores in its table a group of resource identifiers and permissions, such as read, write, or own for resources in the target device such as memory, storage, or FPGAs by way of nonlimiting example. Protection control logic 1010 uses protection table 1008 to arbitrate direct hardware access to resources, and may reject the access requests when necessary. Protection control logic 1010 allows the software stack to bump certain ranges of the node address space to a given set of disaggregated computing resources in the system with a particular role. Because address spaces may already be mapped to different types of resources, this approach may integrate seamlessly with those existing mappings. When protection control logic 1010 detects a violation from a remote node, such as in this example when FPGA 710-1 attempts to write to memory 720 after coming back online, it blocks that particular request and sends a NAK back to the operator.

Protection control logic 1010 exposes an interface that allows a remote or local software stack to modify protection table 1008. This interface allows, for a given address range, a set of fields that describe a given protection mechanism. The interface can be accessed by remote nodes, such as those nodes that have permission to carry out reconfigurations.

Protection control logic 1010 is also responsible to validate that any request coming from a remote node does not violate any of the address range protections specified in protection table 1008.

Protection table 1008 contains in one example a set of decoding rules that describe protections associated with a given address range of resources on the host of the fabric interface 904. These protection features may be associated with a given address range and corresponding metadata, such as identifiers for DCRs that have permission to access the internal resource.

In one example, each rule contains:
  a. A list of disaggregated computer resources that have read permission to the address range.
  b. A list of disaggregated computing resources that have write permission to the address range.
  c. Action to be taken upon detecting a violation. This may include, by way of nonlimiting example, generating a NAK back to the requester, communicating the violation to SDI manager 580, or generating a message to a list of nodes.
  d. A list of entities that are to be notified upon detecting a violation.

In some cases, application 514 may be aware of this protection mechanism, although it may not be responsible for enforcing it. In that case, the software stack may be adapted to set up methods described herein and be able to process notifications coming from fabric interface 904.

SDI manager 580 and orchestrator 522 may also be extended to process violation notifications and to take corresponding actions.

Fabric protection control logic 1010 may also generate a message to SDI manager 580 or the orchestrator 522 to notify of the restricted memory access attempt. If further attempts to communicate with the memory location are received from FPGA 710-1, they are met with a simple NAK.

SDI manager 580 or orchestrator 522 may take action and coordinate with the violating device, in this case FPGA 710-1. On the other hand, the fabric interface on the violating device, in this case FPGA 710-1, upon receiving the NAK, may communicate to its own software stack that a violation has occurred.

In this case, the software stack may be a bit stream on the FPGA application executed as an accelerator. The specific method to communicate that violation to the software stack depends on the actual disaggregated resource performing the function. At this point, applications running in the compute sled, SDI manager 580, and/or orchestrator 522 may take remedial action. In some cases, the violation may also be propagated to other entities in the SDI fabric to allow faster reaction or more flexible schemes. For example, if another disaggregated resource was configured to interoperate with FPGA A 710-1, it may now be aware that FPGA 710-1 is no longer a valid resource for this application. The other resource may then query SDI controller 580 to determine which resources it should be operating with. The logic of fabric interface 904 in some cases may be reconfigured by remote nodes using novel SDI flows. This allows creating more flexible software architectures.

Figure 11:
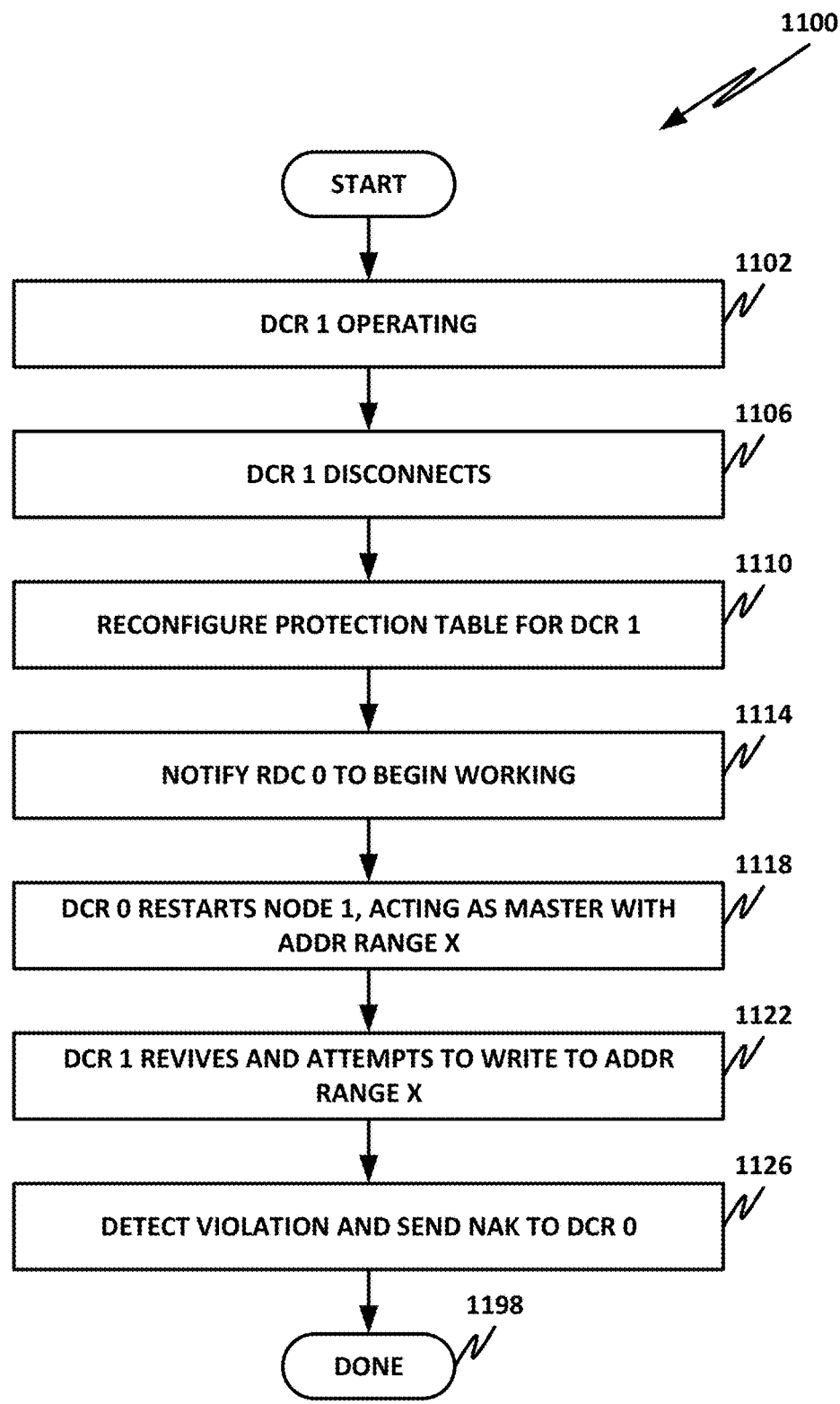
FIG. 11 is a flowchart of a method, according to one or more examples of the present specification.

FIG. 11 is a flowchart of a method 1100, according to one or more examples of the present specification.

In the example of method 1100, a target resource such as a memory range needs to be protected so that it is modified by only one DCR. In an example, orchestrator 522 or SDI controller 580 may set up the protection, such as by initially provisioning a DCR to a composite node, and assigning that DCR read/write/own permission for the target resource. This permission may be pushed out to a physical fabric interface servicing the target resource, such as an SDI fabric interface on a compute sled. Those permissions may persist until the controller detects that the DCR instance has ceased functioning. At that point, the controller may revoke the permissions, and then provision a new DCR instance. The controller may then reassign or transfer the permissions for the target resource to the new DCR instance.

In block 1102, DCR 1 is operating normally. For example, DCR 1 may be FPGA 710-1, which is performing its normal function.

In block 1106, DCR 1 disconnects. For example, the compute sled of FPGA 710-1 may lose a power supply and go down. Thus, FPGA 710-1 is no longer able to function.

In block 1110, an appropriate resource, such as SDI controller 580 or orchestrator 522 reconfigures the protection table 1008 for the resource, substituting DCR 0 for DCR 1. Thus, whereas DCR 0 previously may have had read, write, and own permissions for the resource, those permissions are now assigned to DCR 0.

In block 1114, the resource such as SDI controller 580 or orchestrator 524 notifies DCR 0 that it may begin functioning.

Once DCR 0 has been run up, composite node 502 may restart, with DCR 0 acting as the master for address range "X" containing the target resource.

In block 1122, DCR 1 revives, such as when a hot-swappable power supply is replaced in the compute sled, and FPGA 710-1 begins running again.

DCR 1, such as FPGA 710-1 then attempts to write to address range X.

In block 1126, fabric interface 904 for the target resource detects the violation and sends a NAK to DCR 0, such as FPGA 710-1.

In appropriate circumstances DCR 1 may take remedial action, such as notifying SDI controller 580, or going offline.

To implement this behavior, new traffic flows may be provided.

First, the update table 1008 may be used by an application, by the SDI manager 580, or by orchestrator 522 (with corresponding privileges) to assign a new protection permission with the fields described herein to a particular address range or target resource. The target fabric interface 904 has mechanisms configured by the software stack in the local node to validate that the originator of the request has enough privilege to set up the new protection.

Second, the ordinary SDI fabric write message, which is illustrated herein as a put command, may be extended with a new field in the response that allows notifying the requester that a violation has been detected. In this case, a software interrupt to the local software stack may be generated. The violation identified message may be used by a node homing a given address range that has been violated to notify the violation to one or more pure nodes. Once the peer nodes receive the notification, they may also generate a software interrupt to notify the software stack of the violation.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A storage medium herein is expressly intended to include any special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a network controller, comprising: a processor; and a resource permission engine to: provision a composite node comprising a processor and a first disaggregated compute resource (DCR) remote from the processor, the first DCR to access a target resource; determine that the first DCR has failed; provision a second DCR for the composite node, the second DCR to access the target resource; and instruct the target resource to revoke a permission for the first DCR and grant the permission to the second DCR.

Example 2 includes the network controller of example 1, wherein the permission is a write permission.

Example 3 includes the network controller of example 1, wherein the permission is an own permission.

Example 4 includes the network controller of example 1, wherein the target resource is a memory.

Example 5 includes the network controller of example 1, wherein to instruct the target resource comprises providing directives to a fabric interface servicing the target resource.

Example 6 includes the network controller of example 1, wherein the resource permission engine is further to receive a notification that the first DCR has attempted a restricted access to the target resource and take a remedial action.

Example 7 includes the network controller of example 6, wherein the remedial action comprises deprovisioning the first DCR.

Example 8 includes the network controller of example 7, wherein deprovisioning the first DCR comprises instructing a host hardware to deprovision the first DCR.

Example 9 includes the network controller of example 8, wherein the host hardware is a compute sled.

Example 10 includes a data center network orchestrator comprising the network controller of any of examples 1-9.

Example 11 includes one or more tangible, non-transitory computer-readable mediums having stored thereon instructions for providing a resource permission engine to: provision a composite node comprising a processor and a first disaggregated compute resource (DCR) remote from the processor, the first DCR to access a target resource; determine that the first DCR has failed; provision a second DCR for the composite node, the second DCR to access the target resource; and instruct the target resource to revoke a permission for the first DCR and grant the permission to the second DCR.

Example 12 includes the one or more tangible, non-transitory computer readable mediums of example 11, wherein the permission is a write permission.

Example 13 includes the one or more tangible, non-transitory computer readable mediums of example 11, wherein the permission is an own permission.

Example 14 includes the one or more tangible, non-transitory computer readable mediums of example 11, wherein the target resource is a memory.

Example 15 includes the one or more tangible, non-transitory computer readable mediums of example 11, wherein to instruct the target resource comprises providing directives to a fabric interface servicing the target resource.

Example 16 includes the one or more tangible, non-transitory computer readable mediums of example 11, wherein the resource permission engine is further to receive a notification that the first DCR has attempted a restricted access to the target resource and take a remedial action.

Example 17 includes the one or more tangible, non-transitory computer readable mediums of example 16, wherein the remedial action comprises deprovisioning the first DCR.

Example 18 includes the one or more tangible, non-transitory computer readable mediums of example 17, wherein deprovisioning the first DCR comprises instructing a host hardware to deprovision the first DCR.

Example 19 includes the one or more tangible, non-transitory computer readable mediums of example 18, wherein the host hardware is a compute sled.

Example 20 includes a data center network orchestrator comprising the one or more tangible, non-transitory computer readable mediums of any of examples 11-19.

Example 21 includes a software defined infrastructure controller comprising the one or more tangible, non-transitory computer readable mediums of any of examples 11-20.

Example 22 includes a computer-implemented method of providing a resource permission engine, comprising: provisioning a composite compute node comprising a processor located on a first physical node and a first disaggregated compute resource (DCR) instance located on a second physical node, the first DCR to access a target resource; determining that the first DCR instance has failed; provisioning a second DCR instance for the composite node, the second DCR instance to access the target resource; and instructing a protection control logic of the target resource to revoke a permission for the first DCR instance and grant the permission to the second DCR instance.

Example 23 includes the method of example 22, wherein the permission is a write permission.

Example 24 includes the method of example 22, wherein the permission is an own permission.

Example 25 includes the method of example 22, wherein the target resource is a memory.

Example 26 includes the method of example 22, wherein instructing the protection control logic comprises providing directives to a fabric interface servicing the target resource.

Example 27 includes the method of example 22, wherein the resource permission engine is further to receive a notification that the first DCR instance has attempted a restricted access to the target resource and take a remedial action.

Example 28 includes the method of example 27, wherein the remedial action comprises deprovisioning the first DCR instance.

Example 29 includes the method of example 28, wherein deprovisioning the first DCR instance comprises instructing a host hardware to deprovision the first DCR instance.

Example 30 includes the method of example 29, wherein the host hardware is a compute sled.

Example 31 includes an apparatus comprising means to perform the method of any of examples 22-30.

Example 32 includes the apparatus of example 31, wherein the means comprise a processor and a memory.

Example 33 includes the apparatus of example 32, wherein the memory comprises machine-readable instructions, that when executed cause the apparatus to perform the method of any of examples 22-30.

Example 34 includes the apparatus of any of examples 31-33, wherein the apparatus is a computing system.

Example 35 includes the apparatus of example 34, wherein the apparatus is a network orchestrator.

Example 36 includes the apparatus of example 34, wherein the apparatus is a software defined infrastructure controller.

Example 37 includes at least one computer readable medium comprising instructions that, when executed, implement a method or realize an apparatus as illustrated in any of examples 22-36.

Example 38 includes a fabric interface apparatus, comprising: a local interface to communicatively couple the apparatus to a target resource; a fabric interface to communicatively couple the apparatus to a fabric; and protection control logic to: receive via the fabric an instruction from a network controller to apply a permission to the target resource, the permission associated with a first disaggregated compute resource (DCR); receive via the fabric an access request to the target resource, the access request identifying a second DCR; determine that the second DCR does not have permission to access the target resource; and deny access to the target resource.

Example 39 includes the fabric interface apparatus of example 38, wherein the protection control logic is further to send a NAK to the second DCR.

Example 40 includes the fabric interface of example 38, wherein the protection control logic is further to notify the network controller of the denied access request.

Example 41 includes the fabric interface of any of examples 38-40, wherein the fabric interface is a software defined infrastructure (SDI) fabric interface.

Example 42 includes the fabric interface of example 41, wherein the controller is a network orchestrator.

Example 43 includes the fabric interface of example 41, wherein the controller is an SDI controller.

Example 44 includes the fabric interface of any of examples 38-40, wherein the local interface is a sled backplane.

Example 45 includes a multichip package comprising the fabric interface of example 38.

Example 46 includes a semiconductor integrated circuit comprising the fabric interface of example 38.

Example 47 includes a composite node, comprising: a processor; a memory comprising an application; a disaggregated compute resource (DCR) comprising a first instance and a second instance, wherein the DCR is to access a target resource; and executable logic to: apply a permission to the target resource, the permission associated with the first instance; determine that the first instance has failed; revoke the permission for the first instance; and associate the permission with the second instance.

What is claimed is:

1. A network controller, comprising:
a first processor; and
a resource permission engine to:
provision a composite node comprising a second processor and a first disaggregated compute resource (DCR) remote from the second processor, the first DCR to access a target resource;
determine that the first DCR has failed;
provision a second DCR for the composite node, the second DCR to access the target resource; and
instruct the target resource to revoke a permission for the first DCR and grant the permission to the second DCR.

2. The network controller of claim 1, wherein the permission is a write permission.

3. The network controller of claim 1, wherein the permission is an own permission.

4. The network controller of claim 1, wherein the target resource is a memory.

5. The network controller of claim 1, wherein to instruct the target resource comprises providing directives to a fabric interface servicing the target resource.

6. The network controller of claim 1, wherein the resource permission engine is further to receive a notification that the first DCR has attempted a restricted access to the target resource and take a remedial action.

7. The network controller of claim 6, wherein the remedial action comprises deprovisioning the first DCR.

8. The network controller of claim 7, wherein deprovisioning the first DCR comprises instructing a host hardware to deprovision the first DCR.

9. The network controller of claim 8, wherein the host hardware is a compute sled.

10. A data center network orchestrator comprising the network controller of claim 1.

11. One or more tangible, non-transitory computer-readable mediums having stored thereon instructions for providing a resource permission engine to:
provision a composite node comprising a processor and a first disaggregated compute resource (DCR) remote from the processor, the first DCR to access a target resource;
determine that the first DCR has failed;
provision a second DCR for the composite node, the second DCR to access the target resource; and
instruct the target resource to revoke a permission for the first DCR and grant the permission to the second DCR.

12. The one or more tangible, non-transitory computer readable mediums of claim 11, wherein the permission is a write permission.

13. The one or more tangible, non-transitory computer readable mediums of claim 11, wherein the permission is an own permission.

14. The one or more tangible, non-transitory computer readable mediums of claim 11, wherein the target resource is a memory.

15. The one or more tangible, non-transitory computer readable mediums of claim 11, wherein to instruct the target resource comprises providing directives to a fabric interface servicing the target resource.

16. The one or more tangible, non-transitory computer readable mediums of claim 11, wherein the resource permission engine is further to receive a notification that the first DCR has attempted a restricted access to the target resource and take a remedial action.

17. The one or more tangible, non-transitory computer readable mediums of claim 16, wherein the remedial action comprises deprovisioning the first DCR.

18. The one or more tangible, non-transitory computer readable mediums of claim 17, wherein deprovisioning the first DCR comprises instructing a host hardware to deprovision the first DCR.

19. The one or more tangible, non-transitory computer readable mediums of claim 18, wherein the host hardware is a compute sled.

20. A fabric interface apparatus, comprising:
a local interface to communicatively couple the apparatus to a target resource;
a fabric interface to communicatively couple the apparatus to a fabric; and
protection control logic to:
receive via the fabric an instruction from a network controller to apply a permission to the target resource, the permission associated with a first disaggregated compute resource (DCR);
receive via the fabric an access request to the target resource, the access request identifying a second DCR;
determine that the second DCR does not have permission to access the target resource; and
deny access to the target resource.

21. The fabric interface of claim 20, wherein the protection control logic is further to send a NAK to the second DCR.

22. The fabric interface of claim 21, wherein the protection control logic is further to notify the network controller of the denied access request.

23. A multichip package comprising the fabric interface of claim 20.

24. A semiconductor integrated circuit comprising the fabric interface of claim 20.

25. A composite node, comprising:
a processor;
a memory comprising an application;
a disaggregated compute resource (DCR) comprising a first instance and a second instance, wherein the DCR is to access a target resource; and
executable logic to:
apply a permission to the target resource, the permission associated with the first instance;
determine that the first instance has failed;
revoke the permission for the first instance; and
associate the permission with the second instance.

* * * * *